United States Patent [19]

Ehrich et al.

[11] Patent Number: 4,499,960
[45] Date of Patent: Feb. 19, 1985

[54] METHOD FOR MEASURING THE WEIGHT OF BULK GOODS LOADED BY A HYDRAULIC EXCAVATOR

[75] Inventors: Gerd Ehrich, Monheim; Eberhard Dobner, Ratingen, both of Fed. Rep. of Germany

[73] Assignee: Mannesmann Aktiengesellschaft, Dusseldorf, Fed. Rep. of Germany

[21] Appl. No.: 481,637

[22] Filed: Apr. 4, 1983

Related U.S. Application Data

[63] Continuation-in-part of Ser. No. 389,716, Jun. 18, 1982.

[30] Foreign Application Priority Data

Aug. 5, 1981 [DE] Fed. Rep. of Germany ....... 3130901
May 28, 1982 [DE] Fed. Rep. of Germany ....... 3220143

[51] Int. Cl.³ .................... G01G 23/37; G01G 19/10; G01G 19/02
[52] U.S. Cl. .................... 177/25; 177/141; 177/146; 177/1
[58] Field of Search .................... 177/25, 1, 141, 146, 177/147

[56] References Cited

U.S. PATENT DOCUMENTS 3,913,690 10/1975 Hutchings et al. ............. 177/147 X
4,055,255 10/1977 Vasquez ......................... 177/141 X
4,230,196 10/1982 Snead .................................. 177/141

Primary Examiner—George H. Miller, Jr.
Attorney, Agent, or Firm—Mandeville and Schweitzer

[57] ABSTRACT

The present invention is directed towards a method for measuring the weight of bulk goods loaded or, alternatively, loading performance over time of hydraulic earth moving machines, excavators or similar machines which are provided with a hydraulically operated material loading scoop. Typically, these loading scoops rotate about and are supported on a loading arm. The scoop is controlled and tilted by a hydraulic piston-cylinder unit. The determination of the weight of bulk goods loaded or of the loading performance of the excavator is often required by the operator and the manufacturer of the apparatus, both for the determination of the performance of the apparatus per work shift, or for the computation of the fully loaded weight of a transport vehicle used in carrying away the bulk goods. The measured values used in determining the weight of the loaded material are the pressure in the piston-cylinder unit, arragned between the loading scoop and the loading arm, and an angle defined by the line passing between the pivot point ofthe shovel and the center of gravity of the empty shovel with respect to a horizontal line. These values are fed into a computer, and by using certain predetermined values and a simple force equation, the weight of the contents of the scoop is calculated and then visually indicated. The weight may be accumulated, and then indicated on command, in order to determine the total loaded quantity of bulk goods. Alternatively, the accumulated weight can indicate the loaded performance of the apparatus if displayed at predetermined time intervals.

4 Claims, 2 Drawing Figures

METHOD FOR MEASURING THE WEIGHT OF BULK GOODS LOADED BY A HYDRAULIC EXCAVATOR

RELATED APPLICATIONS

This is a continuation-in-part application of U.S. patent application Ser. No. 389,716, filed June 18, 1982.

BACKGROUND OF THE INVENTION

The present invention is directed toward a method for measuring and determining the loading performance over time to total loaded quantity of bulk goods moved by hydraulic excavators or similar loading or earth moving devices having hydraulically operated arms. These earth moving vehicles typically have an extending loading arm and a loading scoop rotatably arranged about it. A hydraulic piston-cylinder unit is provided between the loading scope and the loading arm for rotatively moving the scoop into its loading and unloading position. According to the present invention, the apparatus is provided with a mechanism for measuring the pressure of the hydraulic cylinder and means for measuring an angle defined by a line connecting the pivot point of the shovel and the center of gravity of the empty shovel in relation to the horizontal, these values being then used to caculate the weight of the load in the scoop.

Operators and manufacturers of the earth moving or bulk goods carrying equipment find the direct measuring of the loading performance, particularly of large earth moving machines, to be of great interest and it is, therefore, in great demand. It may well be of importance to know, for example, the fully loaded quantity of a transport vehicle loaded by a hydraulic excavator, specifically in order to arrive at the weight of the load. It may also be of interest to know the performance of the excavator or of the operating crew per shift and per unit time interval.

DESCRIPTION OF THE PRIOR ART

There are known apparatus which can determine the loading moment of a hydraulic excavator, specifically for the purpose of avoiding overloading of the machine. The loading moment depends on the contents of the scoop shovel and on the working angle of the shovel. The load is customarily determined by measuring the hydraulic pressure in the loading arm and the angular position of the arm by potentiometers. When the upper limit boundary value is exceeded, a signal is either given or the apparatus is automatically switched off.

An apparatus for determining the weight of the contents of a shovel is known from German disclosure document No. 30 20 323. The proposal made there is based on the measurement of pressure in the arm cylinder which is taken at a certain position of the angle of the loadng arm. Measurements based on this principle, however, lead to substantial mistakes. By measuring the pressure in the arm cylinder, the entire weight of the apparatus is taken into consideration which results in substantial measuring distortions. The disortions are greater still when the apparatus is moving during the measuring process. In that case, a pressure is measured in the arm cylinder which is substantially greater than the pressure required to hold the apparatus in position. In addition, in a measuring method according to the cited reference, accurate and reliable measuring is only possible on level ground because overload indications are otherwise unavoidable because of the movement of the center of gravity when the machine is located on sloped surfaces. Loading performance over time or accumulated loading measurements are not provided for in the conventional apparatus.

The present invention is directed to a method for accurate measuring of loading quantities picked up by the loading scoop of a bulk goods or earth excavator type mechanism. Alternatively, the total amount of loaded bulk goods over a predetermined time interval is a desired parameter to be determined according to the present invention.

SUMMARY OF THE INVENTION

It is possible to solve the problems of the existing prior art measuring methods and to accomplish the desired purpose of the present invention in a particularly advantageous manner through the proposal of the invention. In this manner, the weight of the bulk goods loaded by the scoop and the loading performance, i.e., the total weight of the goods loaded over time may be very accurately determined. Since, according to the invention, the measuring is done directly adjacent to the scoop, the possibility of substantial errors is nearly eliminated. Even more accurate and reliable meaasured values can be obtained if the hydraulic pressure in the piston-cylinder unit is not only measured on one side of the cylinder but, in addition, if it is also measured on the side of the piston rod, so that differences in pressure in the cylinder will not distort the perceived loaded weight of the excavator shovel.

It may be of interest in loading a vehicle used to transport the excavated bulk materials to know the total weight of the loaded quantity actually placed into this vehicle. This can be realized by another characteristic of the present invention, wherein it is proposed to accumulate the previously determined individual weights of the contents of the loading scoop.

The full weight of the load contained in the vehicle used to transport the loaded bulk goods can easily be determined by counting the number of loaded scoops, after accumulation of the loaded weights. The total accumulated load weight can then be displayed, on demand. A characteristic work motion of the apparatus, such as, for example, the opening of the scoop lid can be used for counting the number of scoops loaded into the transport vehicle.

One proposal, according to a specific characteristic of the present invention, is that in order to determine the loading performance, the determined weights of the contents of the scoop of several processing sequences are accumulated and indicated in relation to a predetermined time interval.

In this manner, the performance of the excavator may be directly read from a built-in timer so that, for example, the performance for loading one single vehicle, but also during an extended time period, for example a work shift, may easily be determined. All that is required for that purpose is merely to feed in the beginning and the end of the time interval.

Another advantageous characteristic of the present invention lies in the proposal that, while the pressure in the piston-cylinder unit and the angle are being measured, the motion of the loading scoop is briefly interrupted by a control device for the duration of the measuring process. This eliminates excesses in pressure due to motion of the scoop which would otherwise distort the measured value. To this end, it is enough to stop the motion of the scoop for the duration of, for example, only 0.75 seconds.

An exact measuring value is obtained by the proposed process because the measured values are immediately taken proximal to the loading scoop. The movement of the center of gravity from a position when the scoop is unloaded to a position after full loading by the bulk goods, is taken into consideration so that it is also possible to obtain exact measured values of the loads even while the apparatus is working on inclined surfaces. With the proposed method, an accurate determination of the weight of the contents of the scoop of hydraulic excavators is now possible.

An operational step for calculating by computer the loaded weight and the loaded weight per unit time is illustrated in the drawings.

DETAILED DESCRIPTION OF THE PREFERRED EMBODIMENT

Figure 1:
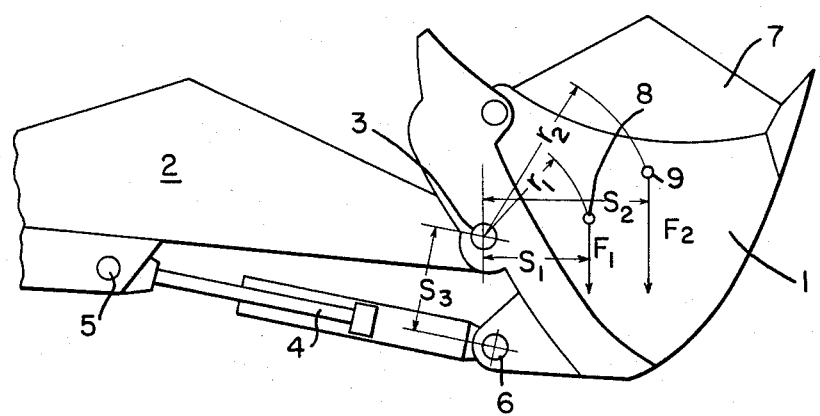
FIG. 1 is a schematic drawing of the support arm and loading scoop of a hydraulic earth mover or excavator.

As best seen in FIG. 1, the loading scoop of an earth excavator is generally identified as 1. Scoop 1 is rotatably pivoted about pivot 3 of lifting arm 2. A hydraulic piston-cylinder unit 4 attached on one end to lifting arm 2 at 5 serves to support and rotate the loading scoop 1. Hydraulic unit 4 is connected on its other end to point 6 of the scoop 1. Thus, scoop 1 pivots about pivot 3 by the extending and contracting action of the hydraulic unit 4. This is the mechanism used for loading and unloading bulk goods into the scoop of the earth excavator. The loading scoop 1 is shown as being filled with bulk goods 7. It is an underlying assumption of the present invention that the bulk goods contained in the scoop are uniformly distributed in the scoop 1.

Figure 2:
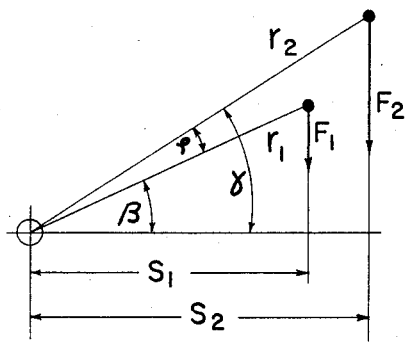
FIG. 2 is an illustration of the force diagram useful in computing the weight of the material contained in the scoop of the excavator.

The center of gravity 8 of the empty loading shovel 1 depends upon the actual weight and structure of the scoop 1 and can, in each instance, be predetermined by computation. As best seen in FIGS. 1 and 2, the force $F_1$ corresponds to the structural weight of the empty loading scoop 1 and is located and downwardly directed at the center of gravity 8. $F_1$ is always located at a distance $R_1$ from pivot point 3. The moment of weight $F_1$ about pivot point 3 is $F_1 \times S_1$; but since $S_1$ is equal to $R_1 \times \cos \beta$ (see FIG. 2) the moment of empty shovel 1 with a weight $F_1$ about point 3 in $F_1 \times R_1 \times \cos \beta$.

The force $F_2$, the weight sought to be determined by the present invention, i.e., the weight of the load in the scoop, acts at center of gravity of the load in the shovel, i.e., at point 9. Force $F_2$ is also downwardly directed but this time acts at the center of gravity 9. The moment of the load of material in the scoop, $F_2$, about pivot point 3 is $F_2 \times S_2$. Since the load $F_2$ will always have a center of gravity 9 at a distance $R_2$ from pivot point 3, then the moment of $F_2$ about pivot point 3 is $F_2 \times R_2 \times \cos \beta + \rho$. This, of course, assumes that the load of material is basically uniformly loaded in scoop 1.

The moment arm $S_1$ of the structural weight $F_1$ of the scoop 1 is located between the vector force $F_1$ acting at center of gravity 8 and the pivot point 3 of the scoop 1. $S_2$ indicates the moment arm of force $F_2$ taken between the force $F_2$ acting at center of gravity 9 and the pivot point 3 of the scoop 1. The distance between the centers of gravity 8, 9 of the forces $F_1$ and $F_2$, i.e., the scoop in the unloaded and fully loaded conditions, from the pivot point 3 of the scoop 1 are indicated as $R_1$ and $R_2$, respectively (see FIG. 1). $S_3$ denotes the moment arm between pivot point 3 and the effective line of the force of the piston-cylinder unit 4. $S_3$ is measured between pivot point 3 and an imaginary line passing through the longitudinal central axis of the piston rod 4.

Accordingly, the weight of the contents of the scoop may be determined as follows. The hydraulic back pressure of the piston-cylinder unit 4 is measured between the arm 2 and the scoop 1. This can be done by a pressure recorder or other pressure sensitive device. Once that pressure is determined, the following relation results from the structural weight $F_1$ of the unloaded scoop 1 having a moment arm distance $S_1$ from between the center of gravity 8 to the pivot point 3 of the scoop 1, a second distance $S_2$ between the center of gravity 9 of loaded scoop 1 to pivot point 3 and the force $F_2$ of the load in the scoop acting at point 9. The moment arm distance $S_3$, also acting on pivot 3, is predetermined for the piston-cylinder unit 4.

Thus,
$Pcyl \times A \times S_3 = F_1 \times S_1 + F_2 \times S_2$ and since $S_1 = R_1 \times \cos \beta$ and $S_2 = R_2 \times \cos (\beta + \rho)$; therefore
$F_2 = 1/(R_2 \times \cos (\beta + \rho))(Pcyl \times A \times S_3 - F_1 \times R_1 \times \cos \beta)$
wherein:

Pcyl is the pressure in the lifting cylinder;

A is the piston surface area;

Beta ($\beta$) is the measured angle between the horizontal and a line connecting pivot point 3 and the center of gravity 8 of the empty scoop 1;

Phi ($\rho$) is an assumed constant angle, as shown in FIG. 2; and $R_1$ is known and $R_2$ is assumed as known and since, as mentioned, the scoop is assumed as being uniformly loaded, $R_1$ and $R_2$ signify the distance between the respective centers of gravity 8 and 9 and the pivot point 3.

Apart from the measured values, i.e., the pressure in the piston-cylinder unit 4 and the angle $\beta$, are the predetermined parameters expressed in the formula which are dependent on the apparatus's structure and may be determined by computation and fed into the computer in a first operational step. Then, merely the measured values, i.e., the back pressure in the piston-cylinder unit 4 and the bailing angle $\beta$ need be fed into a computer as appropriate signals to determine the desired loaded weight of the bulk goods $F_2$. In an alternate embodiment of the invention, the loaded weights, $F_2$, can be accumulated and then displayed at desired intervals. The measurement step may occur in any desired position of the loading scoop 1 and with arm 2 in any position. It would be advantageous if the measured values are determined by activating the control valve for opening the lid scoop. The time delay in operating the hydraulics of the lid scoop should be adequate for a definite determination of the measured values. If, as proposed in the invention, the movement of the loading scoop 1 is briefly stopped, the measurements can be quickly taken without being distorted by the movement of the loading scoop 1.

The teachings of the attached copy of the corresponding German application, upon which this application claims priority, is herein specifically incorporated by reference.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

We claim:

1. A method of measuring the loaded material of a material loading machine having a hydraulically operable loading arm and a material loading scoop pivotable on said loading arm about a pivot point, wherein said holding scoop and said loading arm are connected by a hydraulic piston-cylinder unit located therebetween and apparatus for measuring the bailing angle defined by the horizontal and a line passing through the pivot point of the scoop and the center of gravity of the empty scoop and for measuring the pressure on said hydraulic piston-cylinder unit comprising the steps of:
   (a) feeding a computer the following predetermined fixed values;
      (i) the weight of the empty scoop;
      (ii) the distance from the center gravity of the empty scoop to said pivot point;
      (iii) the surface area of the piston of the piston-cylinder unit and the moment distance of said piston-cylinder unit to said pivot point;
      (iv) the distance from the center of gravity of the load in the scoop to said pivot point;
      (v) the angle between the lines connecting the pivot point to the centers of gravity of the empty scoop and the load in the scoop;
   (b) loading material into the scoop;
   (c) measuring the pressure in said piston-cylinder unit at least in one position of said loading arm;
   (d) measuring said bailing angle at the same position of said loading arm;
   (e) providing said measured pressure and bailing angle values to said computer;
   (f) computing the weight of the loaded material by using said computer which bases its calculations on said fixed predetermined values and said measured pressure and bailing angle values; and
   (g) providing an indication of the weight of said loaded material.

2. A method as claimed in claim 1, wherein:
   (a) said steps (c) and (d) are performed while said loading arm and scoop are momentarily interrupted in their motion.

3. A method as claimed in claim 1, wherein:
   (a) at least two loads of said material loading machine are measured according to steps (a)-(f) of claim 1; and
   (b) said individual weights of said loads are accumulated and then indicated.

4. A method as claimed in claim 3, wherein:
   (a) said accumulated weights of said loads are indicated at predetermined time intervals.

* * * * *